(12) United States Patent
Komiya

(10) Patent No.: US 8,531,727 B2
(45) Date of Patent: Sep. 10, 2013

(54) IMAGE FORMING APPARATUS AND TONE CHARACTERISTICS CORRECTION METHOD

(75) Inventor: Yoshiyuki Komiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 12/556,375

(22) Filed: Sep. 9, 2009

(65) Prior Publication Data
US 2010/0079814 A1 Apr. 1, 2010

(30) Foreign Application Priority Data
Sep. 30, 2008 (JP) .................................. 2008-255245

(51) Int. Cl.
*H04N 1/40* (2006.01)
(52) U.S. Cl.
USPC ......................................... 358/3.06; 358/1.9
(58) Field of Classification Search
USPC ................................................ 358/3.06, 1.9
See application file for complete search history.

(56) References Cited

U.S. PATENT DOCUMENTS

| 5,566,372 A | 10/1996 | Ikeda et al. |
| 2008/0088862 A1* | 4/2008 | Harashima et al. ............ 358/1.9 |

FOREIGN PATENT DOCUMENTS

JP 07-264411 A 10/1995

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

An image forming apparatus includes, for example, a pattern generating unit, image processing unit, image recording unit, and correction unit. The pattern generating unit generates a test pattern signal used to form a test pattern including a plurality of tone patches differing in tonality from each other. The image processing unit performs image processing on the test pattern signal according to a predetermined image processing mode out of a plurality of image processing modes related to tone characteristics. The image recording unit records the test pattern on a recording medium according to the test pattern signal processed by the image processing unit. The correction unit corrects the image processing mode based on a result of reading the test pattern recorded on the recording medium. In particular, the image recording unit records a background pattern around periphery of the test pattern.

18 Claims, 16 Drawing Sheets

F I G. 10A
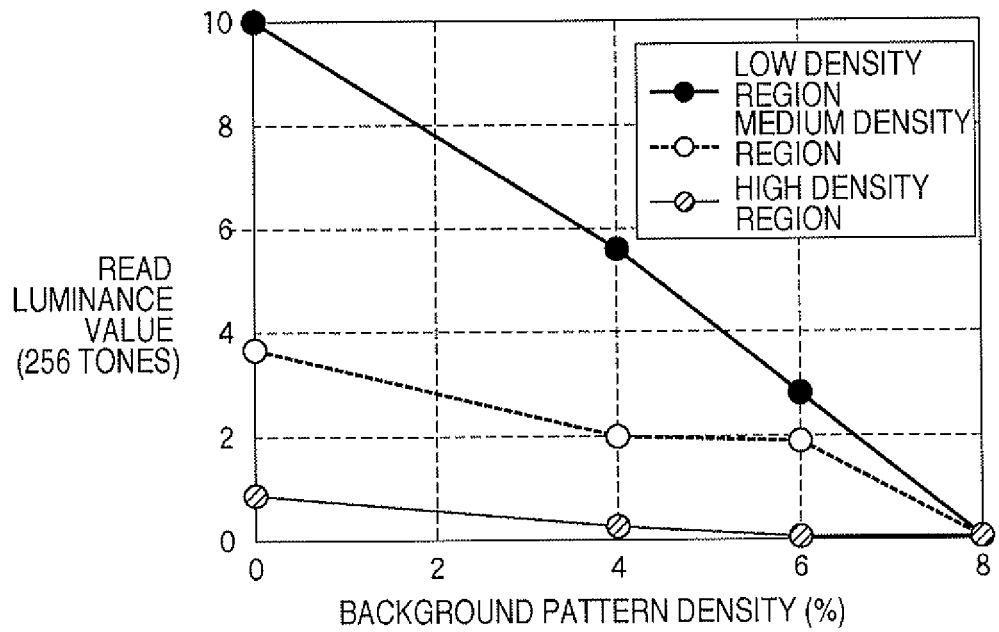
F I G. 10B
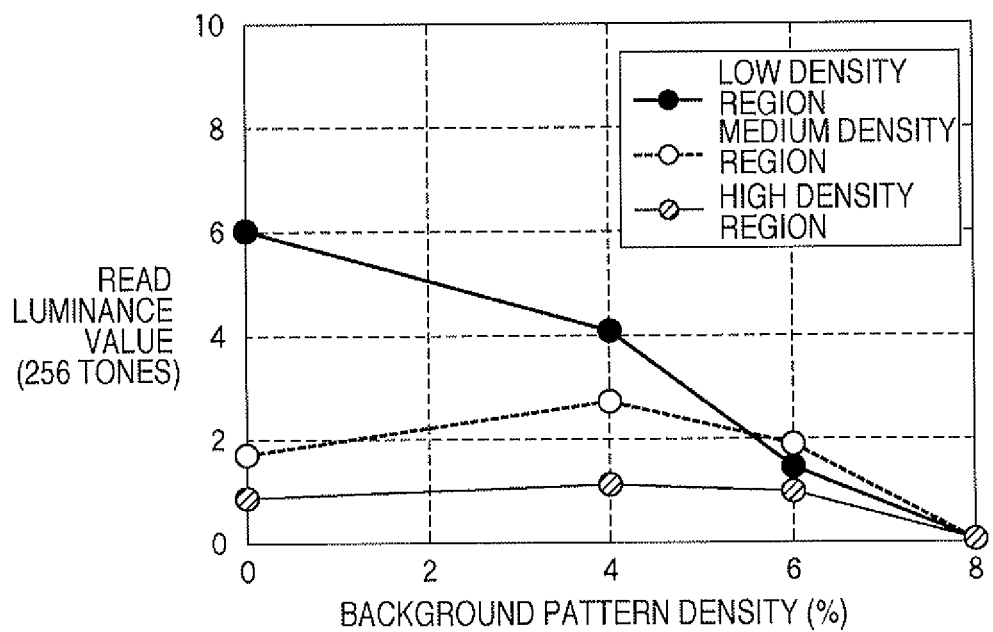

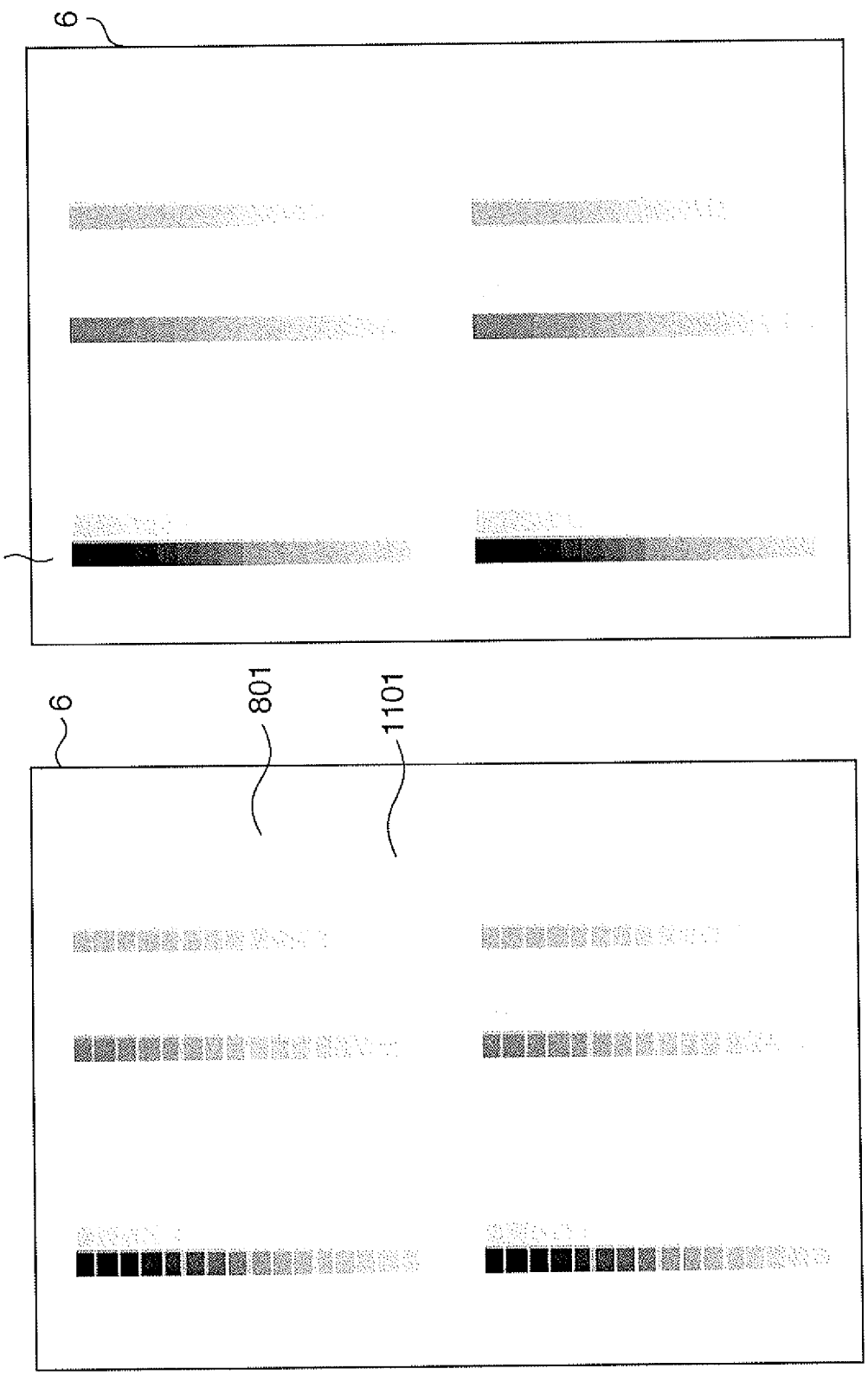

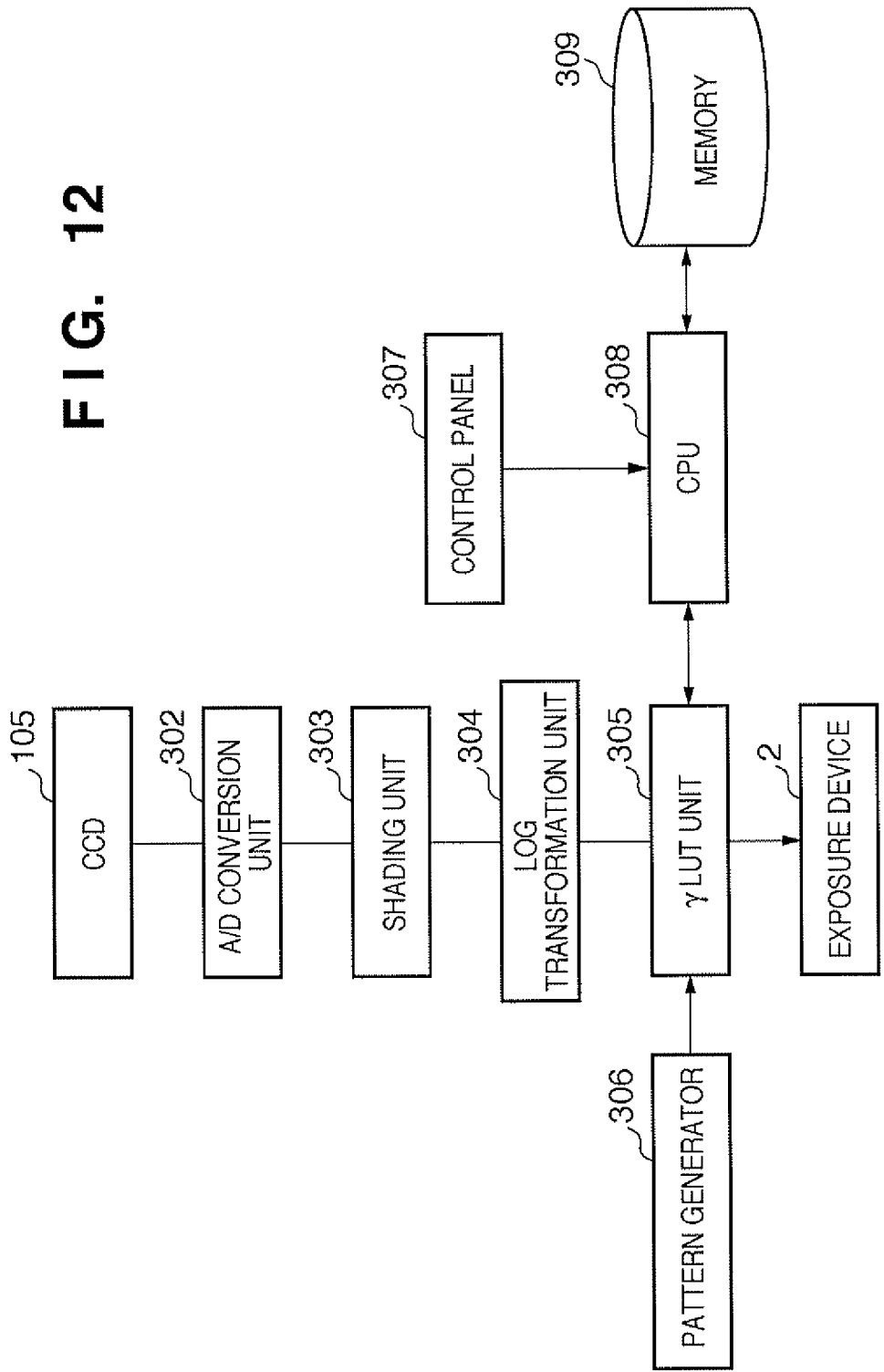

IMAGE FORMING APPARATUS AND TONE CHARACTERISTICS CORRECTION METHOD

BACKGROUND OF THE INVENTION

1. Field of the Invention

The present invention relates to an image forming apparatus of an electrophotographic type or electrostatic recording type, and more particularly, to a technique for correcting tone characteristics.

2. Description of the Related Art

Recently, color multi-function peripherals and color printers have been increasingly installed at offices and copy shops. With such color image forming apparatuses, quality of output images tends to become unstable due to long-term use and environmental variation. To deal with this, it is desirable to form a test pattern on a recording medium and correct tone characteristics of the image forming apparatus by reading the recording medium.

Incidentally, there are color image forming apparatuses which, by holding multiple image processing modes, select and apply an image processing mode according to the content of their output. Each image processing mode is represented, for example, by a γ lookup table (γLUT) for correcting gamma characteristics. However, a contribution rate to characteristic variation of an image forming apparatus varies with the image processing mode. Therefore, tone correction must be performed for each image processing mode. That is, it is desirable to generate and read a test pattern for each image processing mode and thereby create an optimal γLUT for each image processing mode.

Conventionally, most such full-color, multi-function peripherals are expensive and large in size. Recently, however, inexpensive, small apparatuses have started to become popular due to technological advances. In small office/home office (SOHO) and personal uses, in particular, many small, full-color, multi-function peripherals specialized in output of small-size images have come to be used widely.

Even in the case of small, inexpensive, full-color, multi-function peripherals, achieving high image quality and high stability is becoming essential. However, in performing tone correction similar to conventional tone correction for characteristic variation of an image forming apparatus, it has come apparent that there are problems unique to small apparatuses. For example, since the output paper size of small apparatuses is smaller than the output paper size of large apparatuses, it is necessary to reduce the tone pattern size or reduce the number of tone patterns.

Also, the large apparatus forms test patterns for multiple image processing modes on different pieces of output paper. However, it is required of small apparatuses for SOHO or personal use that tone correction can be performed with minimal labor on the part of the user. That is, there is a desire to fit test patterns for different image processing modes on a single piece of output paper. To do so, it is desirable to reduce the size or number of tone patches that make up the test patterns.

However, reduction in the number of tone patches has the disadvantage of degrading the accuracy of the created γLUT. In particular, there is a danger of considerably degrading tone correction accuracy in a low density region and high density region. This is because these regions are influenced significantly by variation in tone characteristics caused by long-term use and environment. Therefore, it is not desirable to reduce the number of tone patches.

While it is desirable to reduce the size of tone patches without reducing the number of tone patches, reduction in the size of tone patches has the disadvantage of reducing reading accuracy of an image reading apparatus which reads the tone patches. This is because when the area of tone patches is reduced, the reading accuracy becomes susceptible to influence from the surface (so-called ground) of the output paper around periphery of the tone patches. Thus, to reduce the size of tone patches, a technique for reducing the influence of the ground is required.

SUMMARY OF THE INVENTION

Accordingly, it is a feature of the present invention to solve at least one of the above and other problems. For example, a feature of the present invention is to abate the influence of ground even if the size of tone patterns is reduced and thereby maintain the accuracy of tone correction. Other problems will become apparent from the entire specification.

The image forming apparatus according to the present invention includes, for example, a pattern generating unit, image processing unit, image recording unit, and correction unit. The pattern generating unit generates a test pattern signal used to form a test pattern including a plurality of tone patches differing in tonality from each other. The image processing unit performs image processing to the test pattern signal according to a predetermined image processing mode out of a plurality of image processing modes related to tone characteristics. The image recording unit records the test pattern on a recording medium according to the test pattern signal processed by the image processing unit. The correction unit corrects the image processing mode based on a result of reading the test pattern recorded on the recording medium. In particular, the image recording unit records a background pattern around periphery of the test pattern.

Further features of the present invention will become apparent from the following description of exemplary embodiments with reference to the attached drawings.

BRIEF DESCRIPTION OF THE DRAWINGS

FIG. 10A is a diagram showing a relationship between background pattern density and luminance level difference (experimental results);

FIG. 10B is a diagram showing a relationship between background pattern density and luminance level difference (experimental results);

FIG. 11C is a diagram showing an example of a test pattern according to the embodiment;

FIG. 11D is a diagram showing an example of a test pattern according to the embodiment;

FIG. 12 is a diagram showing an example of an image processing unit according to the embodiment;

DESCRIPTION OF THE EMBODIMENTS

Embodiments of the present invention will be described below. The individual embodiments described below will be useful in understanding various concepts of the present invention including superordinate concepts, subordinate concepts, and lower subordinate concepts. It is to be understood that the technical scope of the present invention is defined only by the appended claims, and is not limited to any particular embodiment described below.

First Embodiment

Figure 1:
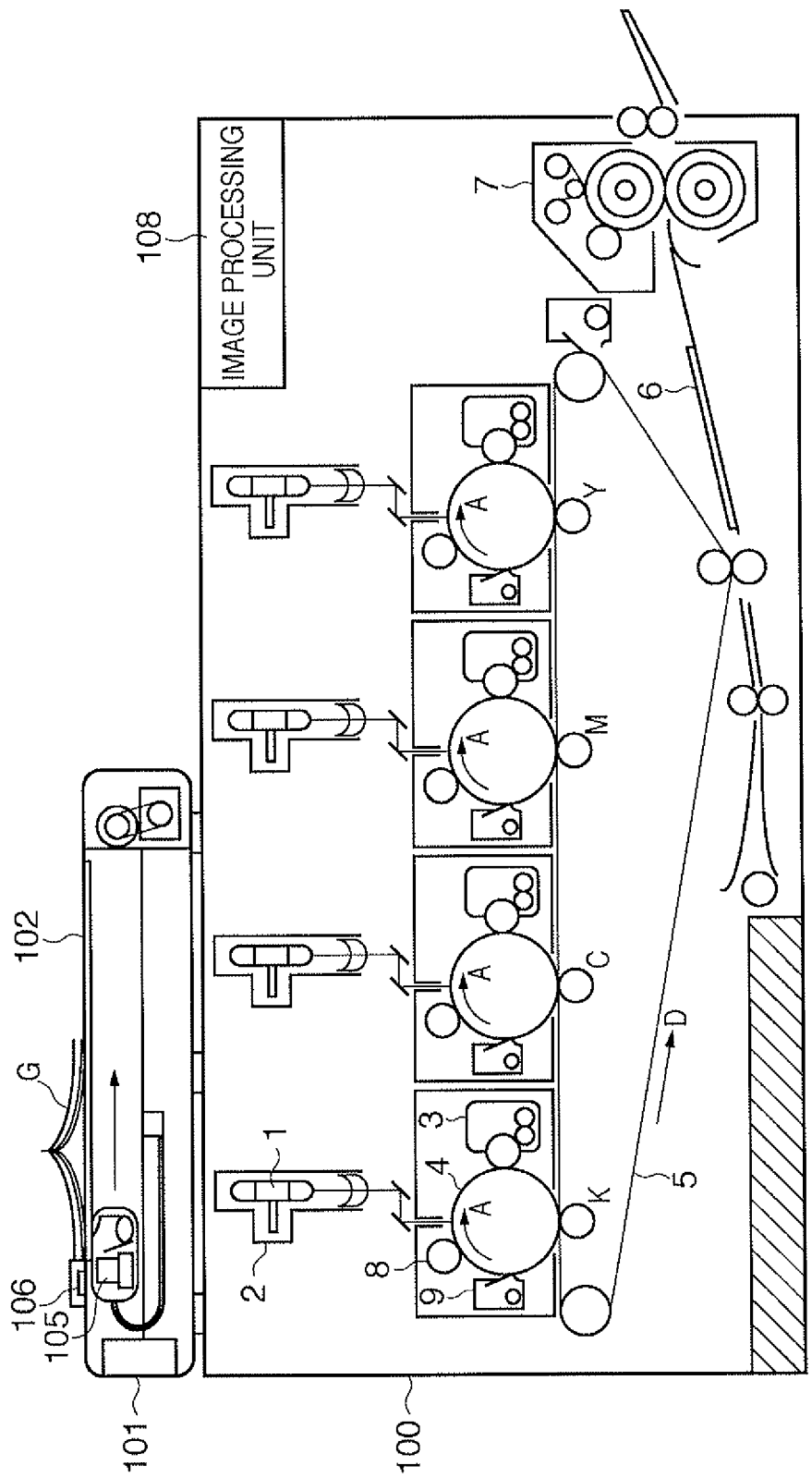
FIG. 1 is a sectional view of an image forming apparatus 100 and image reading apparatus 101 according to an embodiment.

FIG. 1 is a sectional view of an image forming apparatus 100 and image reading apparatus 101 according to an embodiment. In the embodiment, the image forming apparatus 100 and image reading apparatus 101 constitute copiers or multi-function peripherals. The image forming apparatus 100 and image reading apparatus 101 may be interconnected via a host computer.

The image reading apparatus 101 may also be referred to as an image reader or image scanner. An original G placed on a original platen 102 is illuminated by a light source. Next, light reflected from the original forms an image on a CCD sensor 105 via an optical system. The CCD sensor 105 includes, for example, three lines of CCD line sensors. The three lines of CCD line sensors correspond to red, green, and blue, respectively. A reference white plate 106 is installed on the original platen 102 to determine a white level of the CCD sensor 105 and perform shading correction in a thrust direction of the CCD sensor 105. An image signal obtained by the CCD sensor 105 is sent to an image processing unit 108 for image processing.

The image forming apparatus 100 is equipped with a printer engine which records images on recording media. The image forming apparatus 100 is a tandem-type, and image forming stations for respective developing colors (Y, M, C, and K) are arranged in parallel. Each image forming station includes an exposure device 2, developing device 3, photosensitive drum 4, electrostatic charging device 8, and cleaning device 9, where the exposure device 2 is equipped with a polygonal mirror 1. The image forming station is an example of an image recording unit which records a test pattern on a recording medium according to a test pattern signal processed by the image processing unit.

The electrostatic charging device 8 which, for example, is a roller charger, negatively charges a surface of the photosensitive drum 4 uniformly by applying a bias. An image signal output from the image processing unit 108 is converted into a laser beam via a laser driver and laser light source of each exposure device 2. The laser beam is reflected by the optical system including the polygonal mirror 1, lenses, and mirrors and directed at the uniformly charged photosensitive drum 4. A latent image is formed as a result of scanning with the laser beam. Incidentally, the photosensitive drum 4 rotates in the direction of arrow A in FIG. 1. The image processing unit 108 is an example of an image processing unit which performs image processing of a test pattern signal according to a predetermined image processing mode out of a plurality of image processing modes related to tone characteristics.

The developing device 3, which contains a developer (e.g., toner), develops a latent image formed on the photosensitive drum 4 and thereby forms a developer image (toner image). The visualized toner image is transferred on a primary basis to an intermediate transfer member 5 held in pressing contact with the photosensitive drum 4. Any toner remaining on the photosensitive drum 4 without being transferred onto the intermediate transfer member 5 in the primary transfer process is scraped off by a cleaning device 9 and collected in a waste toner container (not shown). This process is performed for each developer color. Consequently, a color toner image is formed on the intermediate transfer member 5.

Subsequently, the color toner image formed on the intermediate transfer member 5 and yet to be fixed moves in the direction of arrow D and is transferred onto a recording medium 6 on a secondary basis. The unfixed color toner image on the recording medium 6 is fixed by a fixing device 7. Incidentally, the recording medium may also be referred to as recording material, paper, sheets, transfer material, and transfer paper.

[Tone Correction]

Generally, gamma correction is performed on image forming apparatuses. Gamma correction is the process of converting image data (image signal) to make density characteristics of the image forming apparatus 100 ideal. Gamma correction uses a γLUT prepared in advance.

Figure 2:
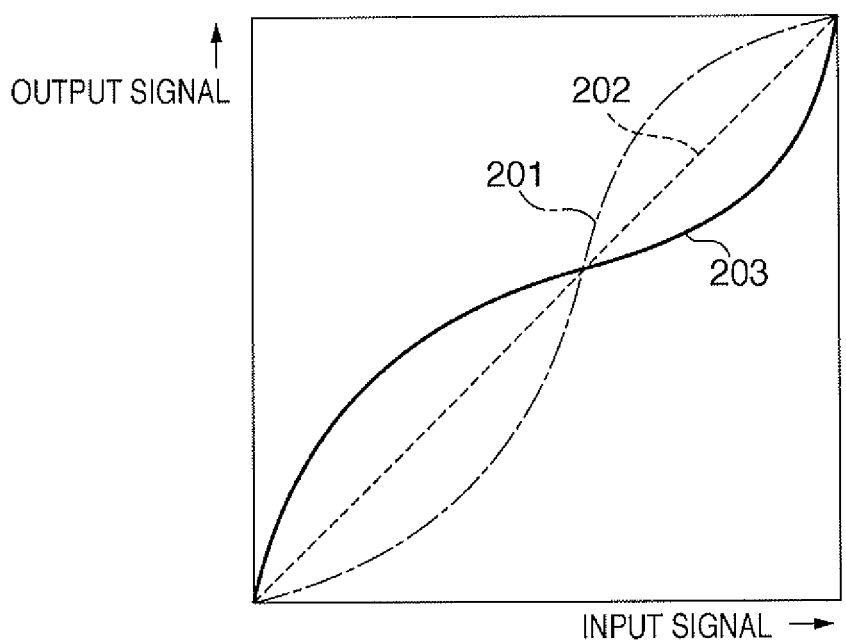
FIG. 2 is a diagram explaining a concept of gamma correction.

FIG. 2 is a diagram explaining the concept behind gamma correction. The abscissa represents an input signal in a γLUT while the ordinate represents an output signal from the γLUT. The dash-and-dot line 201 represents original tone characteristics not subjected to gamma correction. Broken line 202 represents ideal tone characteristics (target tone characteristics). The solid line 203 represents characteristics in the γLUT. By the application of the γLUT, the original tone characteristics are converted into the target tone characteristics. Incidentally, it is known that density characteristics of image forming apparatuses vary with long-term use and environment. Thus, it is necessary to correct the γLUT according to the variation in the density characteristics.

Figure 3:
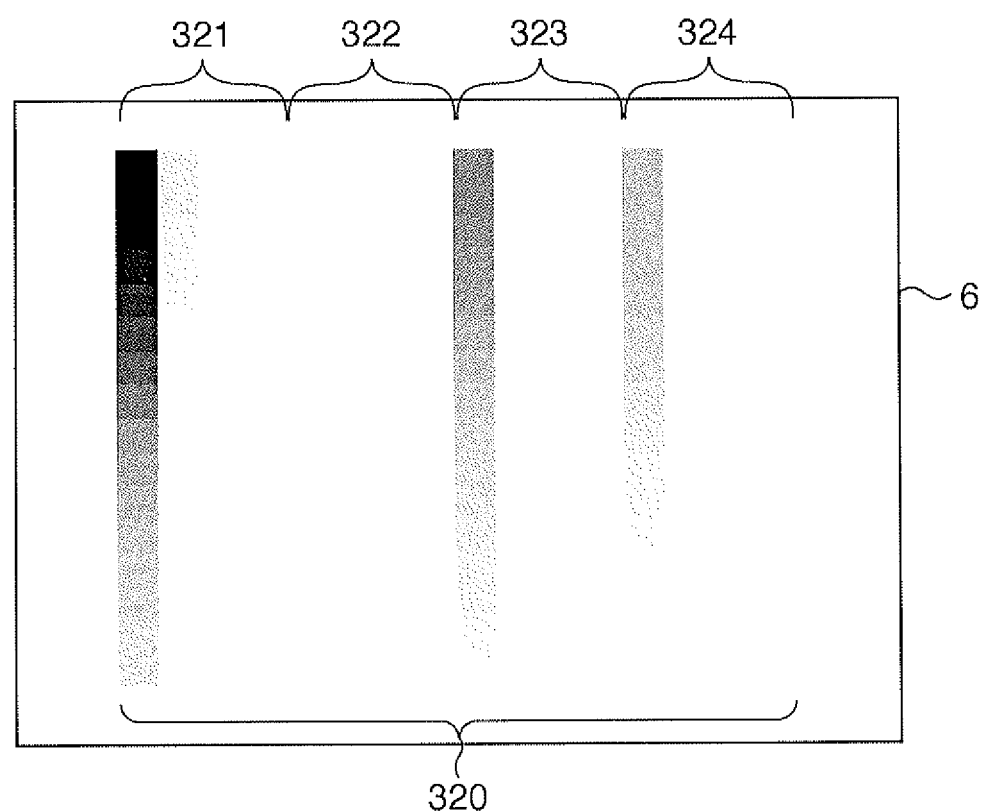
FIG. 3 is a diagram showing an example of a typical test pattern formed on a recording medium.

FIG. 3 is a diagram showing an example of a typical test pattern formed on a recording medium. A test pattern 320 formed on the recording medium 6 includes multiple tone patches for each of Y, M, C, and K. A black tone patch group 321 includes multiple black tone patches which differ in tone. A yellow tone patch group 322 includes multiple yellow tone patches which differ in tone. A magenta tone patch group 323 includes multiple magenta tone patches which differ in tone. A cyan tone patch group 324 includes multiple cyan tone patches which differ in tone. In this example, each group includes 64 tone patches.

Since tone characteristics differ among image forming stations (developer colors), the test pattern 320 contains tone patches for each developer color. The γLUT is corrected based on a relationship between laser outputs used to form respective patches and luminance values (density values) at which the patches are read by the image reading apparatus 101.

Generally, a test pattern 320 is formed and tone correction is performed in each image processing mode. That is, if there are ten image processing modes, ten recording media are required. However, it would be troublesome for SOHO and general home users to perform tone correction using output on a large number of recording media.

Figure 4A:
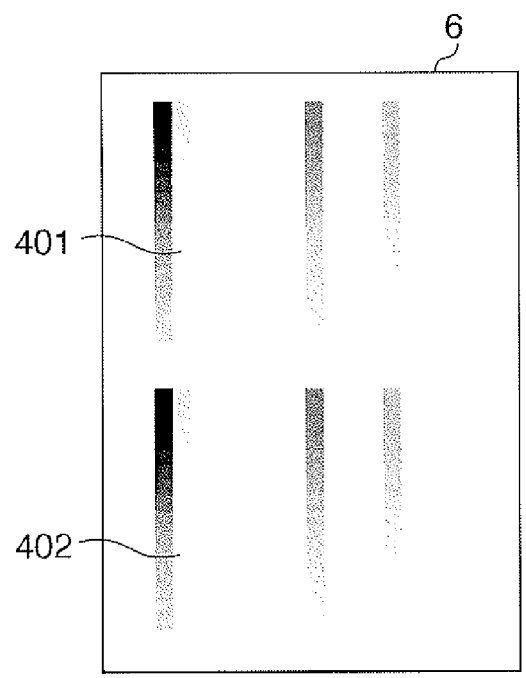
FIG. 4A is a diagram showing a recording medium on which multiple test patterns have been recorded, according to the embodiment.

FIG. 4A is a diagram showing a recording medium on which multiple test patterns have been recorded, according to the embodiment. A first test pattern 401 has been recorded by the application of a first image processing mode. A second test pattern 402 has been recorded by the application of a second image processing mode different from the first image processing mode. If two test patterns are recorded on a single recording medium in this way, the number of tone correction operations is reduced by about one-half.

Figure 4B:
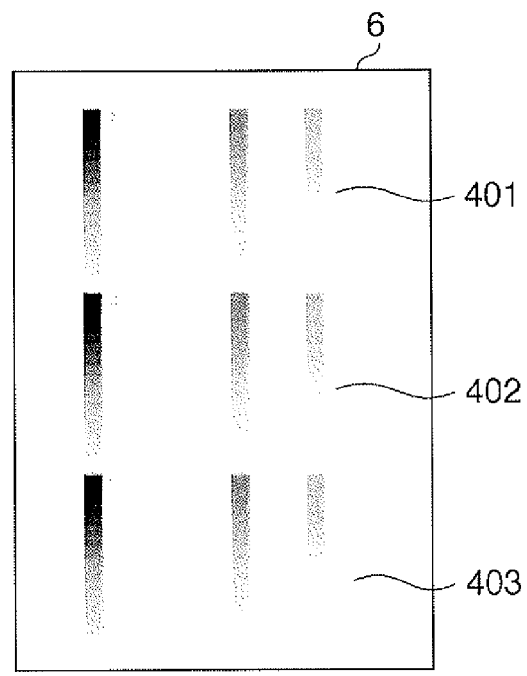
FIG. 4B is a diagram showing a recording medium on which multiple test patterns have been recorded, according to the embodiment.

FIG. 4B is a diagram showing a recording medium on which multiple test patterns have been recorded, according to the embodiment. The first test pattern 401 has been recorded by the application of the first image processing mode. The second test pattern 402 has been recorded by the application of the second image processing mode different from the first image processing mode. A third test pattern 403 has been recorded by the application of a third image processing mode different from the first and second image processing modes. If three test patterns are recorded on a single recording medium in this way, the number of tone correction operations is reduced by about ⅓.

Figure 4C:
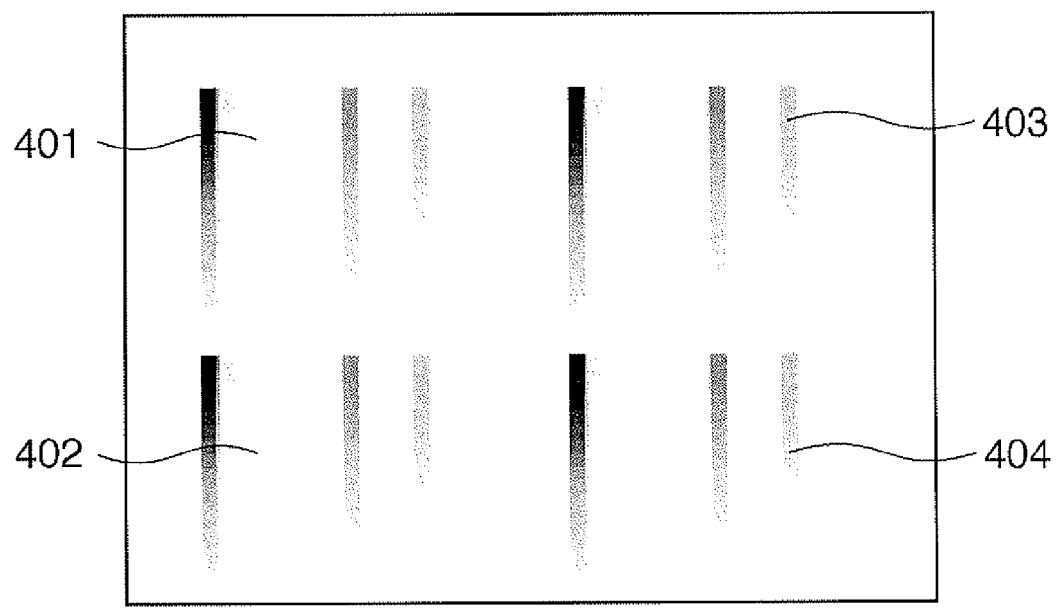
FIG. 4C is a diagram showing a recording medium on which multiple test patterns have been recorded, according to the embodiment.

FIG. 4C is a diagram showing a recording medium on which multiple test patterns have been recorded, according to the embodiment. The first test pattern 401 has been recorded by the application of the first image processing mode. The second test pattern 402 has been recorded by the application of the second image processing mode different from the first image processing mode. The third test pattern 403 has been recorded by the application of the third image processing mode different from the first and second image processing modes. A fourth test pattern 404 has been recorded by the application of a fourth image processing mode different from the first to third image processing modes. If four test patterns are recorded on a single recording medium in this way, the number of tone correction operations is reduced to about ¼.

However, the size of the test patterns shown in FIGS. 4A to 4C is reduced to a fraction of the size (area) of the test pattern shown in FIG. 3. The influence of reductions in the size of the test patterns will be described now.

[Influence of Size Reduction]

Figure 5:
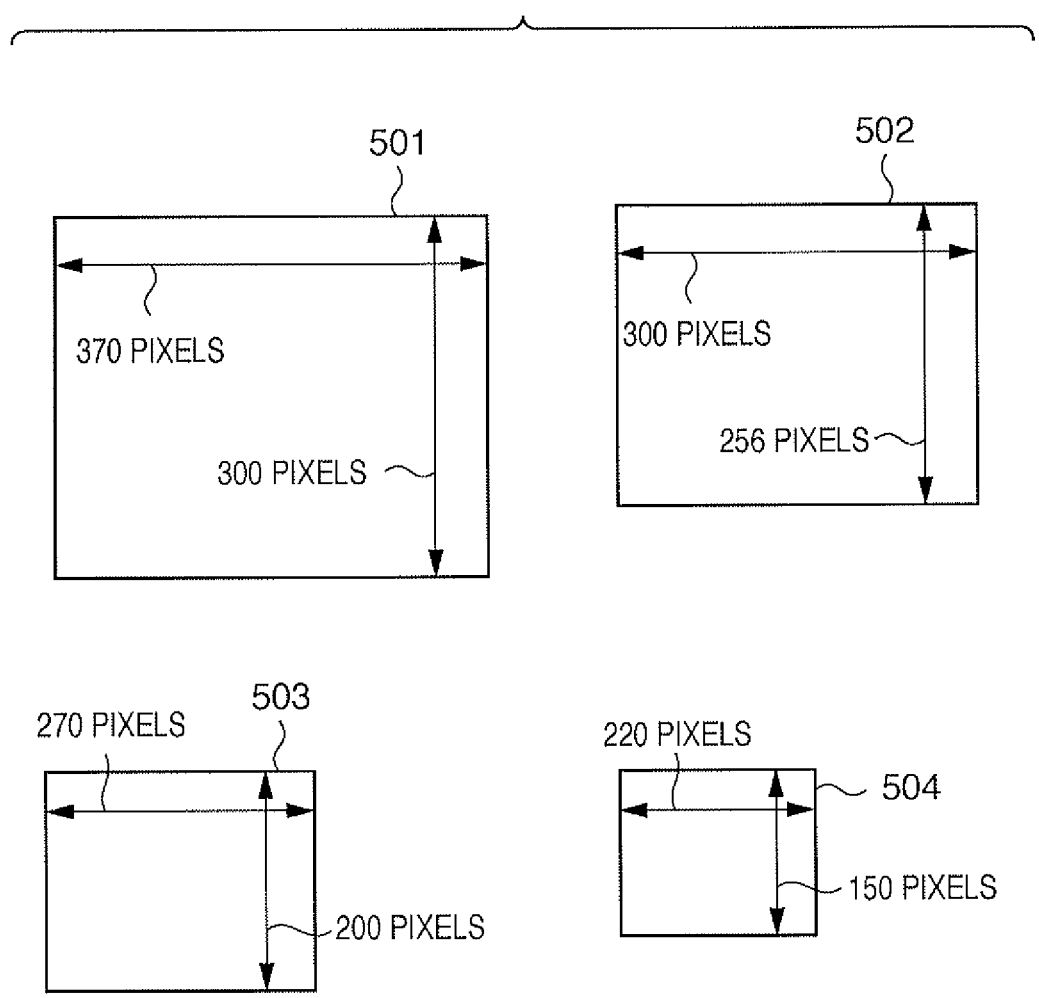
FIG. 5 is a diagram explaining patch sizes.

FIG. 5 is a diagram explaining patch sizes. A patch 501 has a conventional size PS1 (PS1=370 pixels×300 pixels). A patch 502 has a size PS2 (PS2=300 pixels×256 pixels). A patch 503 has a size PS3 (PS3=270 pixels×200 pixels). A patch 504 has a size PS4 (PS4=220 pixels×150 pixels). That is, PS1 is equal to the size of one tone patch shown in FIG. 3. PS2 is equal to the size of one tone patch shown in FIG. 4A. PS3 is equal to the size of one tone patch shown in FIG. 4B. PS4 is equal to the size of one tone patch shown in FIG. 4C.

Figure 6:
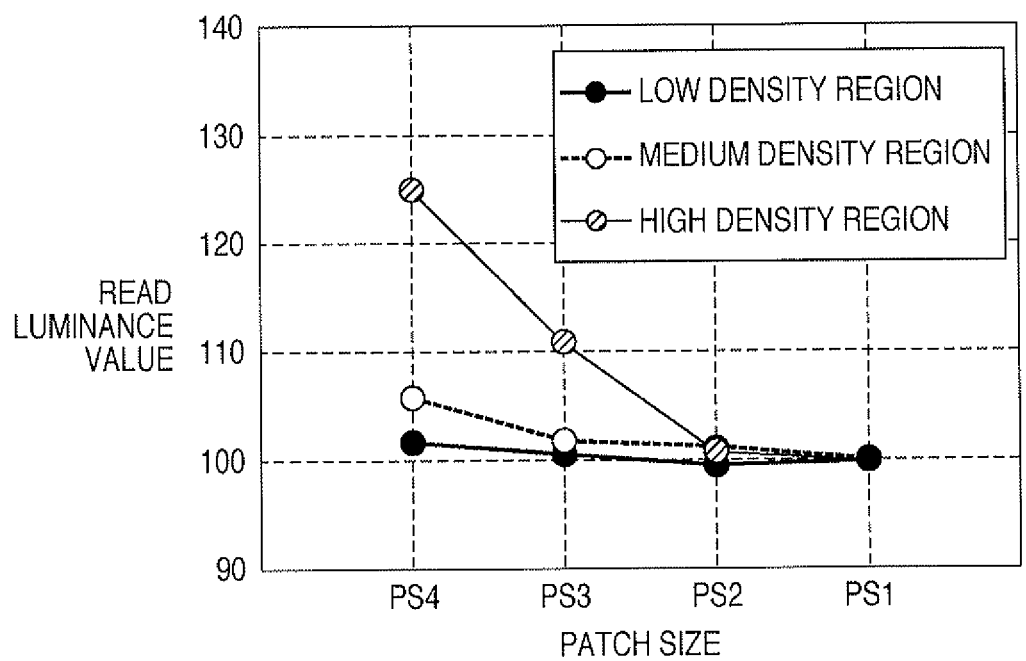
FIG. 6 is a diagram showing a relationship between patch size and read luminance value (experimental results)

FIG. 6 is a diagram showing a relationship between patch size and read luminance value (experimental results). The abscissa represents the patch size while the ordinate represents the read luminance value. The read luminance value (ordinate) has been standardized based on a luminance value of the patch 501. Similarly, the abscissa has been standardized based on the area of the patch 501.

Since the image reading apparatus 101 uses three CCD sensors corresponding to red, green, and blue, three luminance values are read. An average of the three luminance values is used here.

It can be seen from FIG. 6 that differences in luminance value among different densities increase with decreasing patch size. In a high density region, in particular, reductions in the patch size have a significant influence. An upward deviation of the read luminance value indicates that the density converted from the luminance value will be smaller than it should be. Thus, the use of the erroneous luminance value will cause the image forming apparatus to perform tone correction in such a way as to increase the density.

The reason why reductions in the patch size present a problem is that when reading an original, the image reading apparatus is influenced by white ground of the recording medium around periphery of a patch pattern.

Figure 7:
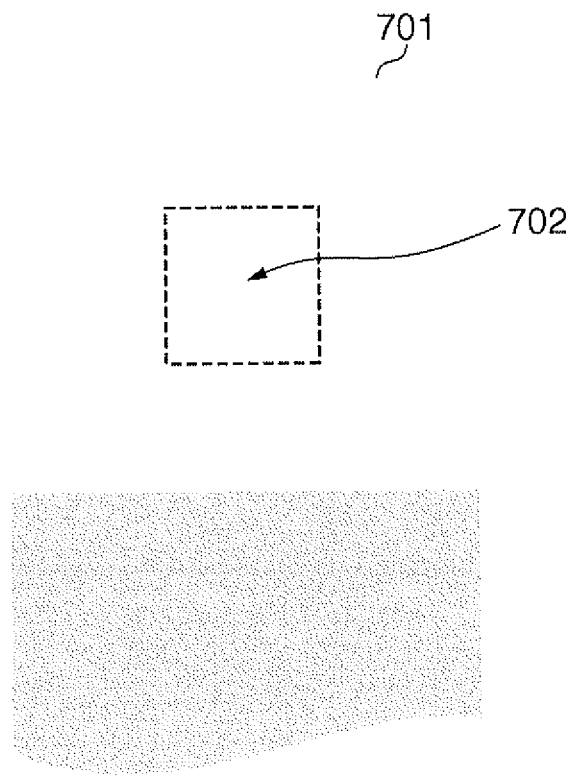
FIG. 7 is a diagram showing a relationship between a patch and read region.

FIG. 7 is a diagram showing a relationship between a patch and read region. As shown in FIG. 7, if a patch 701 is sufficiently larger in size than a read region 702, the luminance value obtained by reading the patch 701 is less subject to the influence of the ground because the read region 702 is well away from the ground. However, reductions in the patch size result in reduced distance between the read region 702 and ground. Consequently, the influence of the ground can no longer be ignored. Above all, in the high density region, due to light reflected from the ground, the luminance value becomes higher than it actually is.

Figure 8:
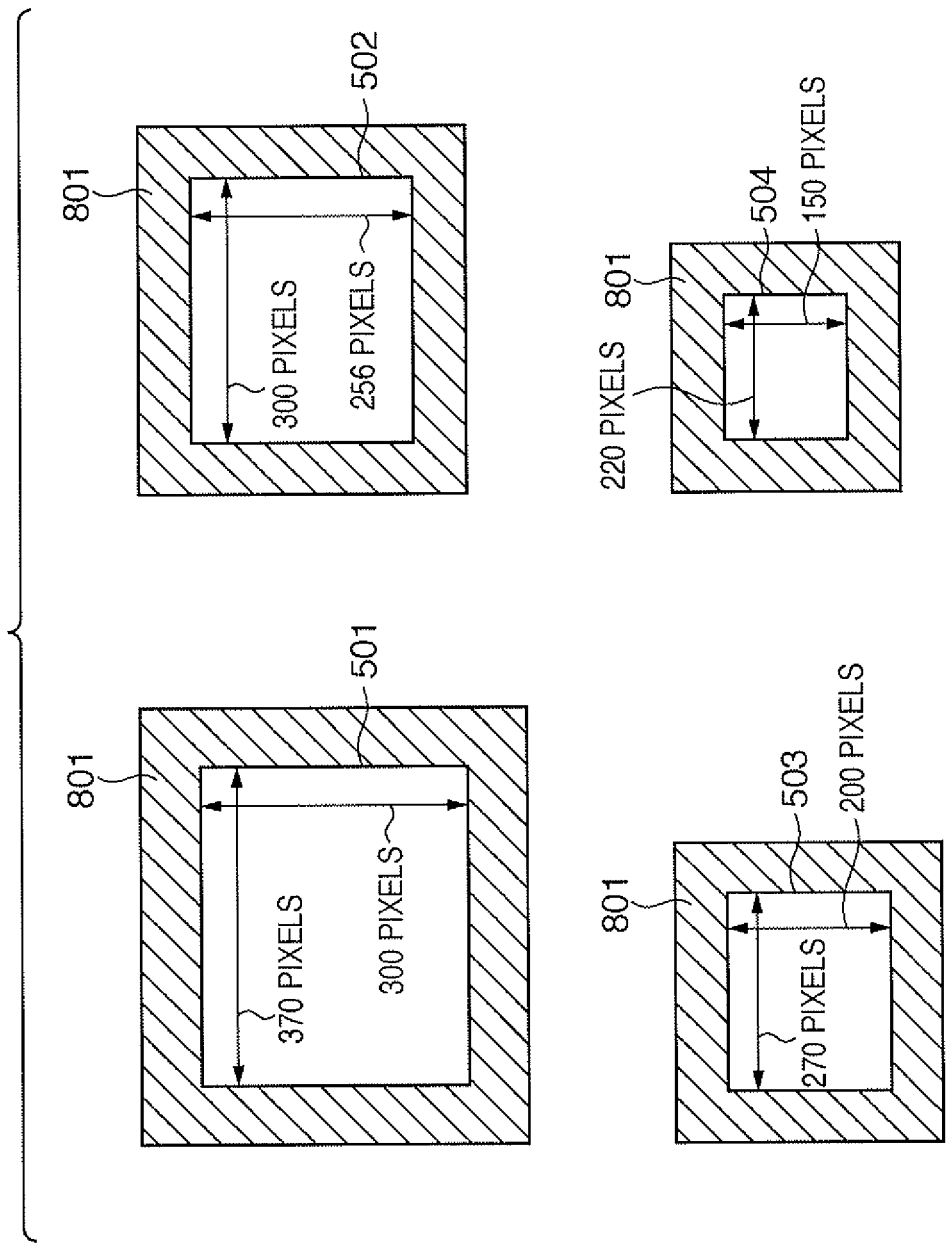
FIG. 8 is a diagram showing a recording of a background pattern around periphery of a patch.

FIG. 8 is a diagram showing a recording of a background pattern around periphery of a patch. A background pattern 801 is recorded at uniform density for all the patches described above. Since the background pattern 801, when provided, increases the distance between the patch and ground, it is believed that the influence of the ground is reduced.

Figure 9:
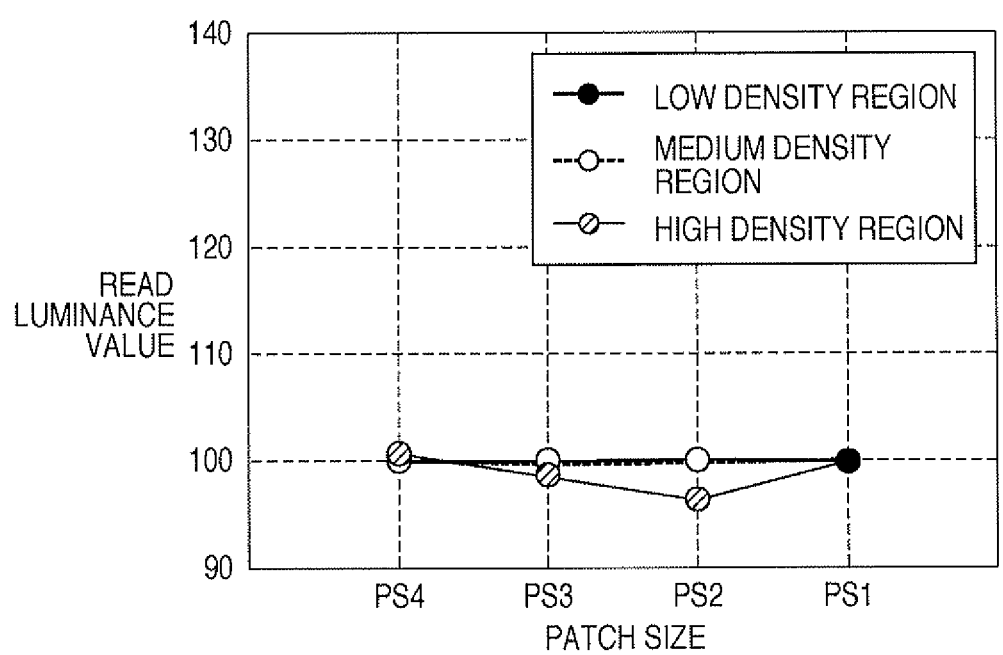
FIG. 9 is a diagram showing a relationship between patch size and read luminance value (experimental results)

FIG. 9 is a diagram showing a relationship between patch size and read luminance value (experimental results). The abscissa represents the patch size while the ordinate represents the read luminance value. The read luminance value (ordinate) has been standardized based on the luminance value of the patch 501. Similarly, the abscissa has been standardized based on the area of the patch 501.

It can be seen from FIG. 9 that the background pattern 801, when provided, stabilizes the luminance values of the patches. The density of the background pattern 801 is 8% when a maximum density value is taken as 100%.

FIG. 10A is a diagram showing a relationship between background pattern density and luminance value level difference (experimental results). Here, the patches have the size PS1. The abscissa represents the background pattern density and the ordinate represents the read luminance value standardized based on the luminance value at 8% density.

FIG. 10B is a diagram showing a relationship between background pattern density and luminance value level difference (experimental results). Here, the patches have the size PS2. The abscissa represents the background pattern density and the ordinate represents the read luminance value standardized based on the luminance value at 8% density.

It can be seen from FIGS. 10A and 10B that with increases in the density of the background pattern, the luminance level becomes less subject to the influence of the ground.

Figure 11A:
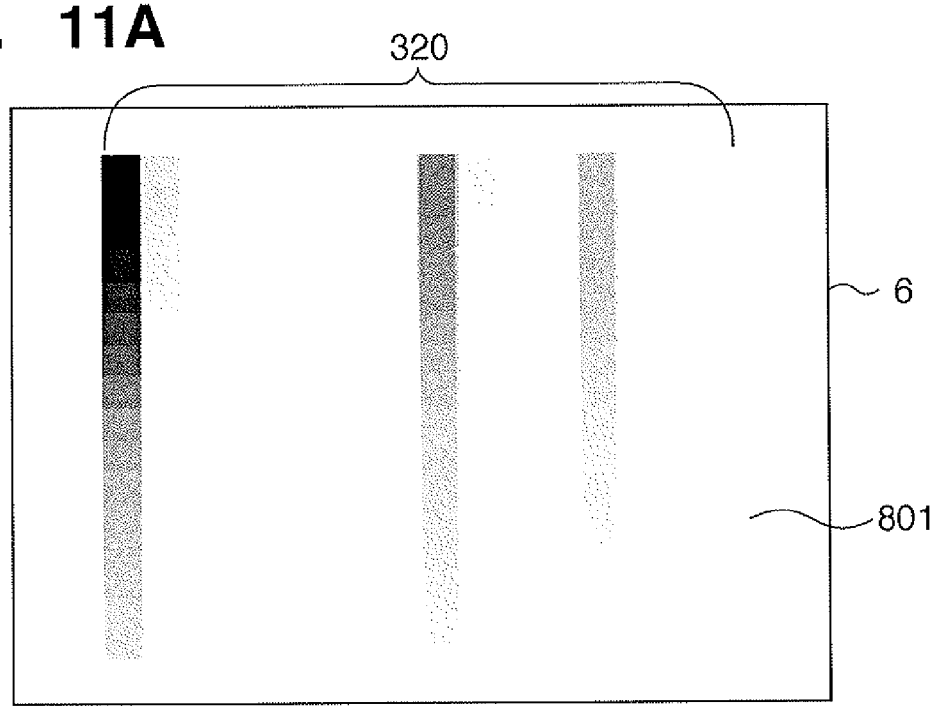
FIG. 11A is a diagram showing an example of a test pattern according to the embodiment.
Figure 11B:
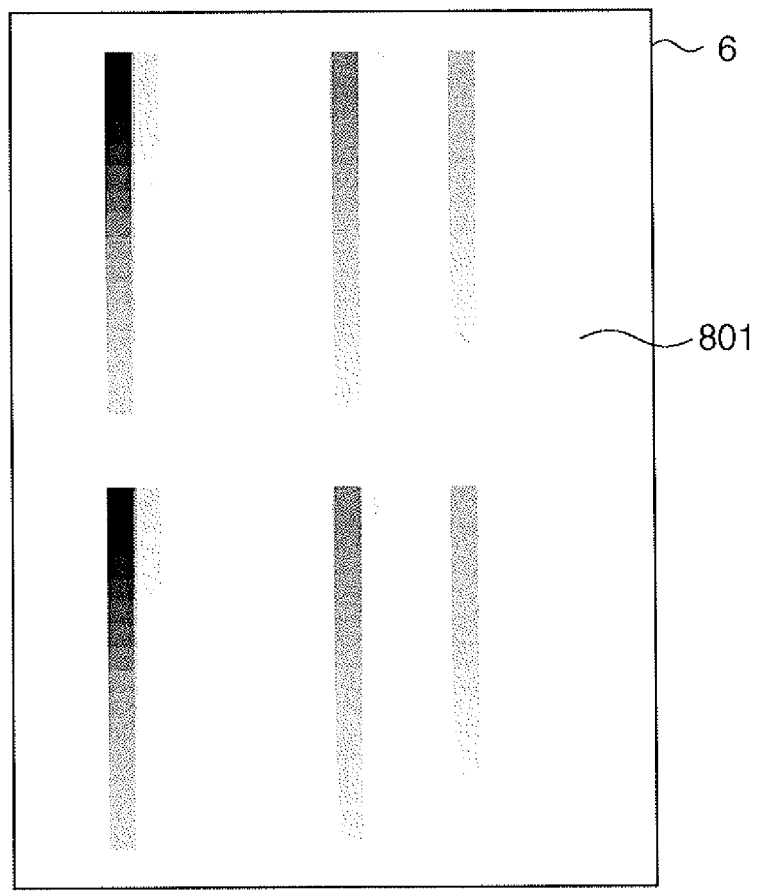
FIG. 11B is a diagram showing an example of a test pattern according to the embodiment.

FIGS. 11A and 11B are diagrams showing examples of test patterns according to the embodiment. Based on the experimental results described above, in the present embodiment, the background pattern 801 of a uniform density is placed around periphery of the test pattern 320 used for tone correction.

FIG. 11C is a diagram showing an example of a test pattern according to the embodiment. Compared to FIG. 11B, in FIG. 11C, a background pattern 1101 is also recorded around each tone patch in addition to the background pattern 801.

FIG. 11D is a diagram showing an example of a test pattern according to the embodiment. According to the present embodiment, a background pattern 1102 is recorded only around periphery of tone patches of high density because, as described above, the higher the density of a region, the stronger the influence of the ground.

Incidentally, although it is desirable that the density of all of the background patterns is also uniform, the density does not necessarily need to be uniform as long as the influence of the ground can be reduced.

FIG. 12 is a diagram showing an example of the image processing unit according to the embodiment. An A/D conversion unit 302 converts an analog luminance signal of an original image into a digital luminance signal when the analog luminance signal is output from the CCD sensor 105. A shading unit 303 makes a shading correction to the digital luminance signal. This is done to correct discrepancies in sensitivity among elements of the CCD sensor 105. A LOG transformation unit 304 performs a LOG transformation of the luminance signal subjected to the shading correction. A γLUT 305 makes a gamma correction to the luminance signal subjected to the LOG transformation. An image signal which is the luminance signal subjected to the gamma correction is transmitted to the exposure device 2.

A pattern generator 306 generates an image signal (test pattern signal) used to form a background pattern together with a test pattern. The test pattern includes tone patches for four colors of cyan, magenta, yellow, and black. The pattern generator 306 is an example of a pattern generating unit which generates a test pattern signal used to form a test pattern including a plurality of tone patches differing in tonality from each other. Incidentally, a γLUT unit 305 performs image processing on the test pattern signal as well.

A control panel 307 includes an input unit which accepts operator inputs from an operator and a display unit which generates information. A CPU 308 is the center of control in the image processing unit 108. A memory 309 is a storage device which provides a work area for the CPU 308.

Figure 13:
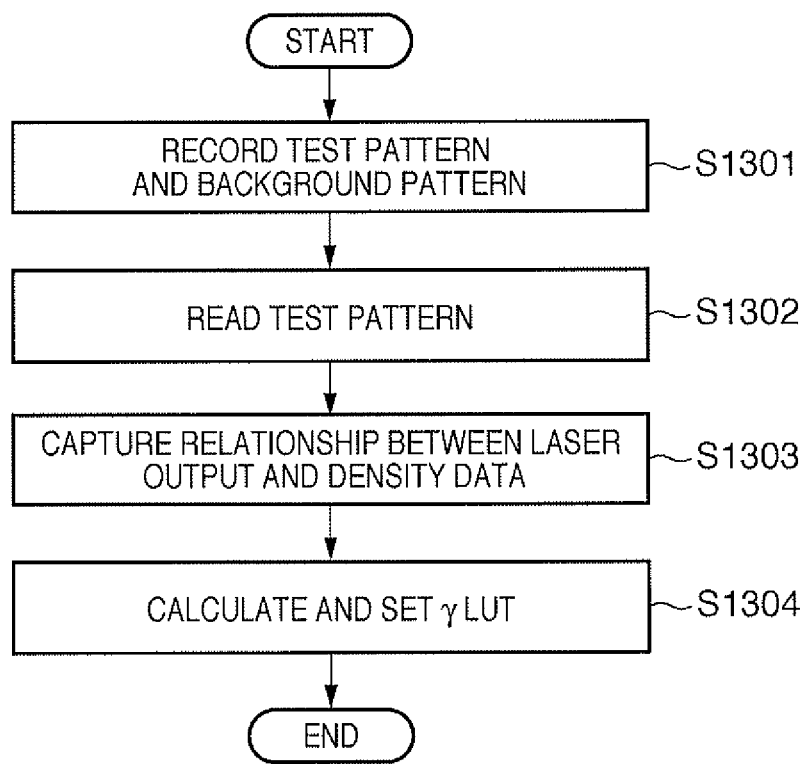
FIG. 13 is a flowchart showing an example of a tone correction method according to the embodiment.

FIG. 13 is a flowchart showing an example of a tone correction method according to the embodiment. When a command to start a tone correction is given via the control panel 307, the CPU 308 starts the series of processes described in the flowchart.

In step S1301, the CPU 308 instructs the pattern generator 306 to output image data which is a combination of a test pattern and background pattern. The pattern generator 306 generates and outputs the image data to the γLUT unit 305.

In step S1302, the CPU 308 reads the test pattern out of the recording medium using the image reading apparatus 101.

Figure 14:
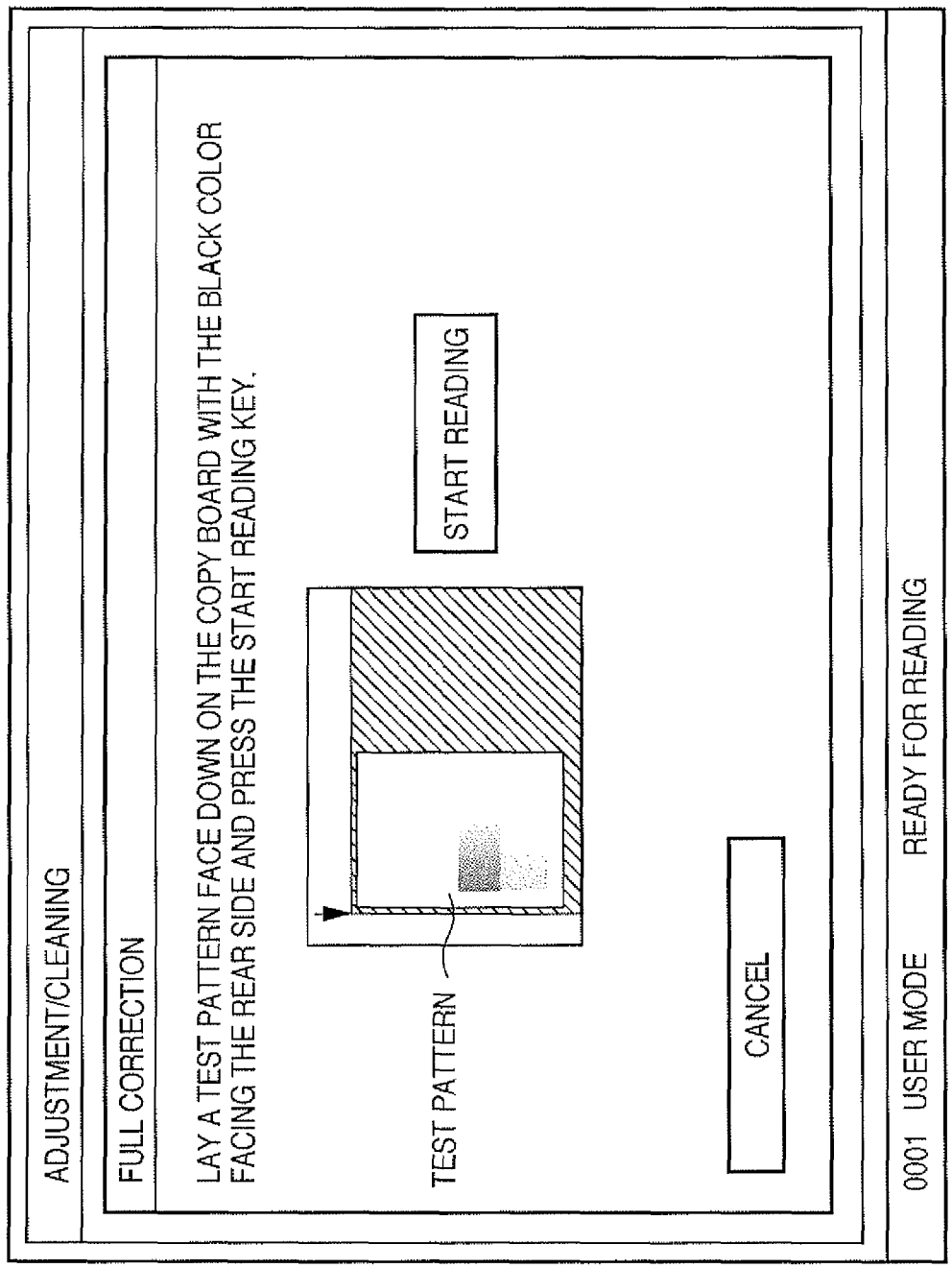
FIG. 14 is a diagram showing an example of information displayed on a control panel.

FIG. 14 is a diagram showing an example of information displayed on the control panel. The control panel 307 displays a message, prompting the user to place a recording medium with a test pattern recorded, on the image reading apparatus. The control panel 307 is, for example, a touch panel. When a Start Reading button displayed on the control panel 307 is pressed, the CPU 308 performs a read. After reading density data, the CPU 308 stores the read density data in the memory 309.

In step S1303, the CPU 308 determines a relationship between the density data and a laser output level used to create the test pattern and stores the relationship in the memory 309.

In step S1304, the CPU 308 generates a gamma lookup table for use to convert the relationship obtained from the test pattern into an ideal relationship and sets the gamma lookup table in the γLUT unit 305.

According to the present invention, since a background pattern is recorded around periphery of test patterns, even if tone patches are reduced in size, the tone patches are less subject to the influence of the ground. This makes it possible to curb degradation in the accuracy of tone correction and thereby provide images which remain stable for a long period of time. Also, since multiple test patterns can be recorded on a single recording medium as a result of patch size reductions, the burden on the user is expected to be lightened.

As a result of an experiment, it was found that the use of a background pattern with a uniform density of 8% or more makes it easy to avoid the influence of the ground. Incidentally, the background pattern, which is shaped like a belt, may be larger in width than one tone patch.

Desirably, multiple tone patches are prepared in each of the multiple developer colors used by the image forming apparatus. The tone patches in each developer color may be formed on a separate recording medium, but this will complicate the tone correction operation. Thus, it will be desirable to record tone patches for different developer colors on a single recording medium.

When multiple test patterns are recorded on a single recording medium as described above, desirably a background pattern is recorded for each test pattern. This is because to record multiple test patterns, it is necessary to reduce the size of each tone patch, making the tone patches more subject to the influence of the ground.

A background pattern may be recorded around each of multiple tone patches as shown in FIG. 11C. This will be useful when there is a low-density tone patch adjacent to a high-density tone patch.

Also, as shown in FIG. 11D, a background pattern may be formed only for one or more tone patches of relatively high density out of the multiple tone patches. This is because there is a significant influence from the ground in the high density region as described above.

The image processing unit 108 may perform image processing by applying different image processing modes to different test patterns. Conventionally, since one recording medium is used per image processing mode, increases in the number of image processing modes result in increases in workload. Thus, if test patterns for multiple image processing modes are recorded on a single recording medium, workloads can be greatly reduced.

Second Embodiment

It has been stated in the first embodiment that desirably the density of the background pattern is uniform. However, when the image forming apparatus has multiple image processing modes, generally, tone characteristics vary with the image processing mode. Thus, it is desirable to perform tone correction in each image processing mode.

Figure 15:
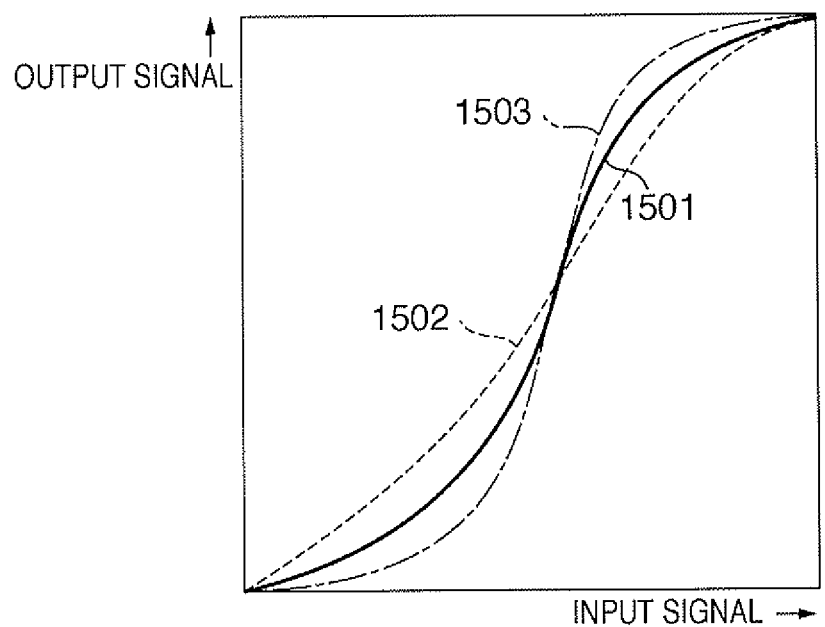
FIG. 15 is a diagram showing an example of tone characteristics for different image processing modes.

FIG. 15 is a diagram showing an example of tone characteristics for different image processing modes. The abscissa represents an input signal and the ordinate represents an output signal. The solid line 1501 represents the tone characteristics for a first image processing mode. The broken line 1502 represents the tone characteristics for a second image processing mode. The dash-and-dot line 1503 represents the tone characteristics for a third image processing mode.

Since the tone characteristics vary with the image processing mode in this way, the density varies among the image processing modes. The tone characteristics of the image forming apparatus also vary with long-term use conditions and environmental conditions such as ambient temperature or humidity, causing changes to the density. It is believed that these factors also cause changes to the density of the background pattern.

Thus, the present embodiment proposes to always use a specific image processing mode for the background pattern. That is, the image processing mode for the background pattern is designed not to depend on the image processing mode used for test patterns.

Figure 16:
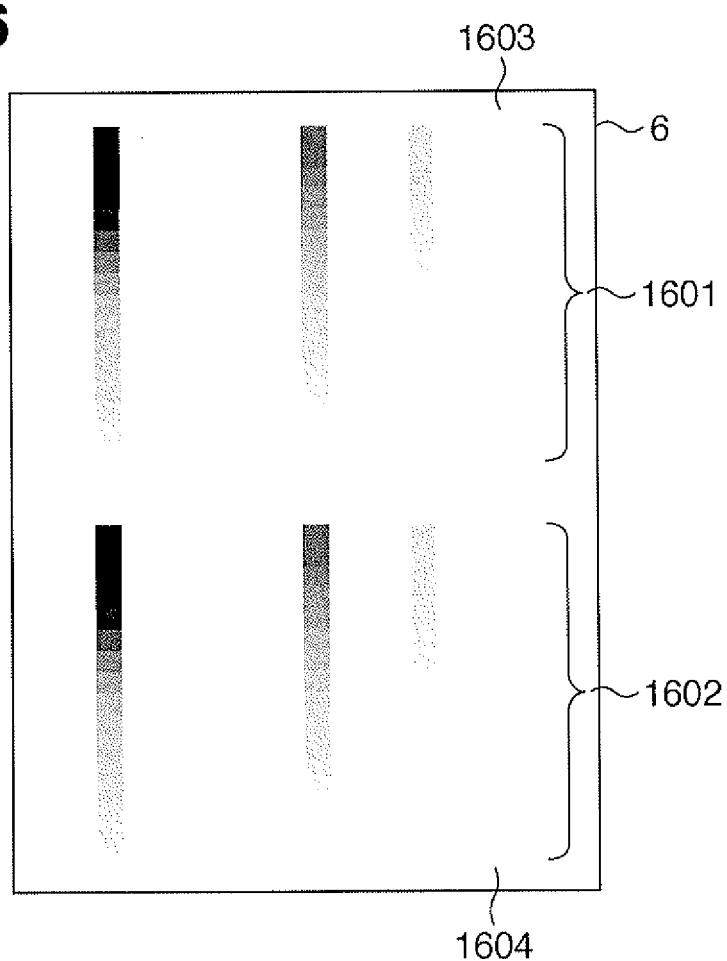
FIG. 16 is a diagram showing an example of multiple test patterns and background patterns.

FIG. 16 is a diagram showing an example of multiple test patterns and background patterns. The first image processing mode is used for a first test pattern 1601. The second image processing mode is used for a first background pattern 1603 provided around periphery of the first test pattern 1601. On the other hand, the second image processing mode is used for a second test pattern 1602. The second image processing mode is also used for a second background pattern 1604 provided around periphery of the second test pattern 1602. That is, the CPU 308 instructs the γLUT unit 305 to always use the same image processing mode for background patterns.

The CPU 308 may use the image processing mode empirically known to have the most stable tone characteristics for background patterns, out of multiple image processing modes. This will reduce the influence of variation in the background patterns on results of reading test patterns.

Alternatively, a dedicated image processing mode different from the image processing modes used for regular image formation may be used for background patterns.

The CPU 308 may use a γLUT corrected as a result of the previous tone correction out of multiple γLUTs, for background patterns. This is because the image processing mode used for background patterns is also influenced by long-term use conditions and environmental conditions.

According to the present embodiment, image processing is performed using the same image processing mode for all the background patterns formed around respective test patterns. Thus, in addition to the advantages of the first embodiment, the present embodiment has the advantage of being able to reduce the influence of variation in the background patterns on results of reading test patterns. This further stabilizes the accuracy of tone correction.

Also, if the image processing mode corrected the previous time is used for background patterns, it is possible to lessen even the influence of long-term use conditions and environmental conditions on the image processing mode used for the background patterns.

Third Embodiment

When a test pattern is formed, density differences may occur on a boundary between a ground area and tone patches. The density differences, which influence results of reading tone patches, must be reduced.

Figure 17:
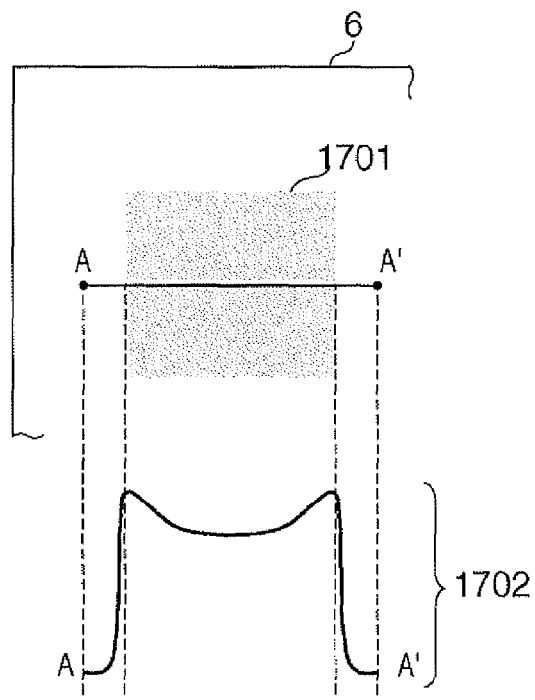
FIG. 17 is a diagram explaining an example of density differences.

FIG. 17 is a diagram explaining an example of density differences. A tone patch 1701 has been recorded on the recording medium 6. In FIG. 17, a density curve 1702 represents the density of the tone patch 1701 along line A-A'. As shown in FIG. 17, the density of the tone patch is not constant in the entire region of the tone patch.

The reason is as follows. When a latent image is formed by the exposure device 2 on the photosensitive drum 4 uniformly charged by the electrostatic charging device 8, there is a large potential difference between the ground area (solid white part) and tone patch area (solid black part). Consequently, when the latent image is developed by the developing device 3, the potential difference causes more toner to be developed on the boundary. This phenomenon is generally referred to as an edge effect or the like. The edge effect is conspicuous, especially on image forming apparatuses of the electrophotographic type.

One technique for reducing the influence of the density differences caused by the edge effect involves making the area of a tone patch larger than the area of a read region as shown in FIG. 7. However, this technique is not usable when a reduction in patch size is an objective. Thus, the present embodiment proposes to record the background pattern using multiple developer colors (i.e., using a mixed color).

Figure 18:
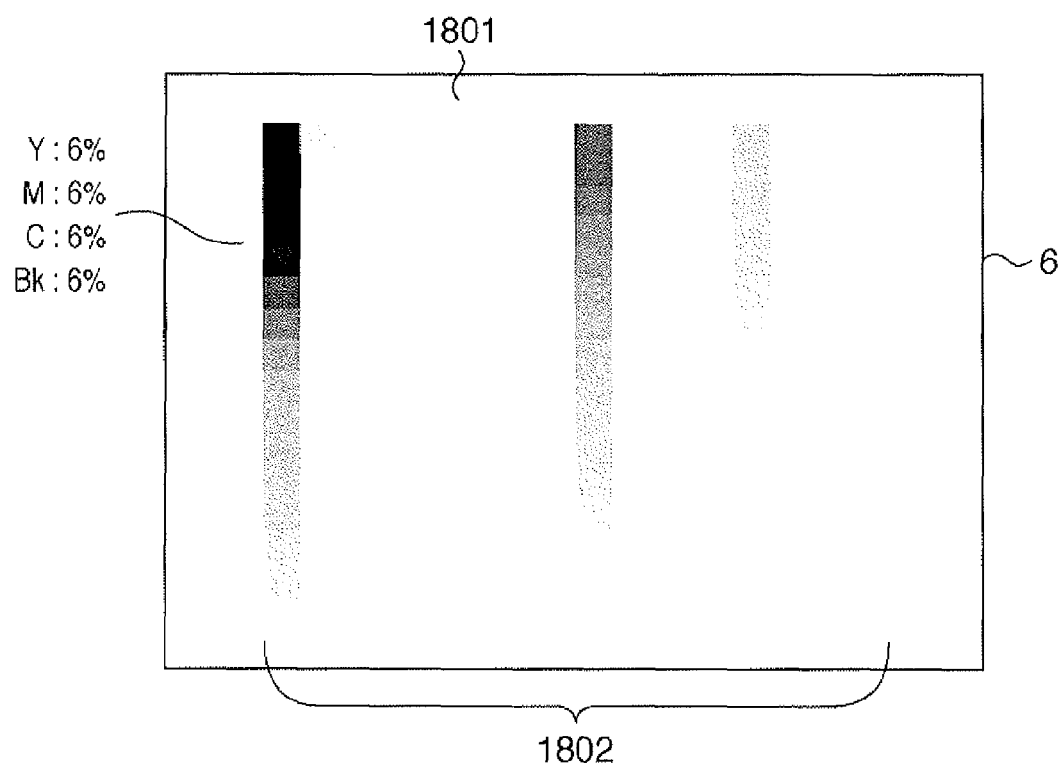
FIG. 18 is a diagram showing an example of a background pattern formed using a mixed color.

FIG. 18 is a diagram showing an example of a background pattern formed using a mixed color. In this example, a background pattern 1801 of uniform density made up 6% each of yellow (Y), magenta (M), cyan (C), and black (Bk) is formed around periphery of a test pattern 1802.

Figure 19:
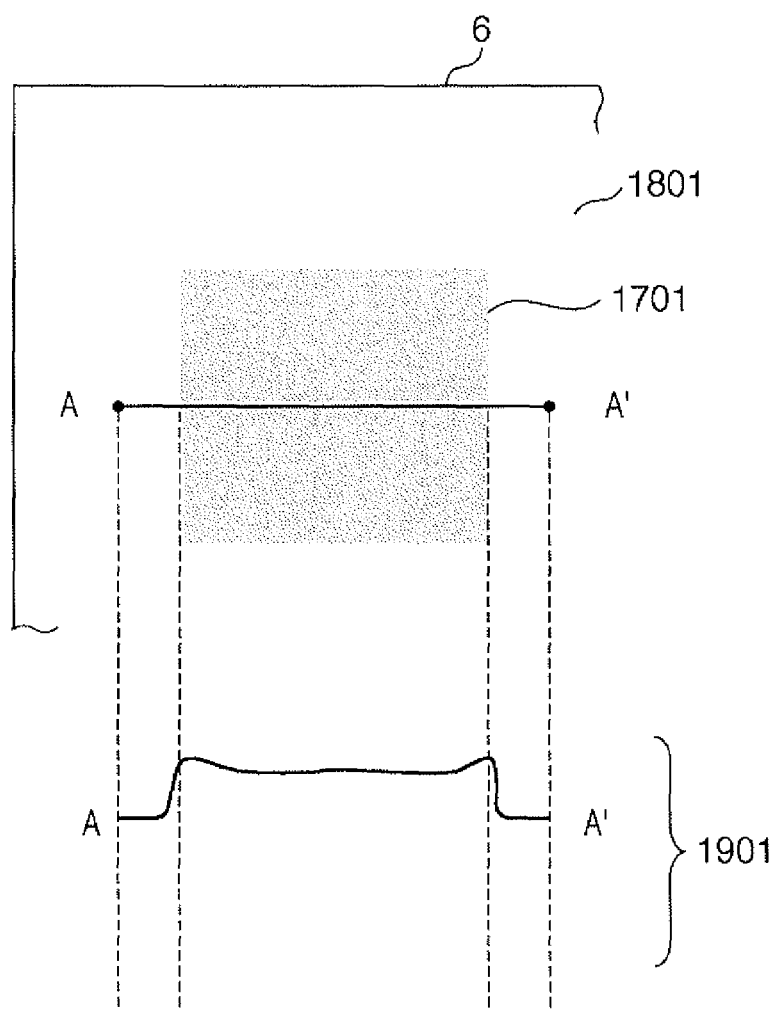
FIG. 19 is a diagram explaining an example of density difference reduction effect.

FIG. 19 is a diagram explaining an example of the density difference reduction effect. A density curve 1901 shows how density differences are reduced by placing the background pattern 1801 around periphery of the tone patch 1701. This is because the potential difference between the ground area and tone patch area has been reduced due to interposition of the background pattern 1801 between the ground area and tone patch area.

The reason why the mixed color is used is that density differences occur at each image forming station. Contribution of each image forming station to formation of the background pattern enables reduction of the density differences.

In addition to the advantages of the first and second embodiments, the present embodiment has the advantage of being able to reduce density differences, and thereby further stabilize the accuracy of tone correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-255245, filed Sep. 30, 2008, which is hereby incorporated by reference herein in its entirety.

What is claimed is:

1. An image forming apparatus comprising:
   a pattern generating unit which generates a test pattern signal used to form a test pattern including a plurality of tone patches differing in tonality from each other;
   an image processing unit which applies image processing to the test pattern signal according to a predetermined image processing mode out of a plurality of image processing modes related to tone characteristics;
   an image recording unit which records the test pattern on a recording medium according to the test pattern signal subjected to the image processing by said image processing unit; and
   a correction unit which corrects the image processing mode based on a result of reading the test pattern recorded on the recording medium, wherein said image recording unit records a background pattern around a periphery of the test pattern on the recording medium to reduce influence from a ground of the recording medium.

2. The image forming apparatus according to claim 1, wherein the background pattern has a uniform density of 8% or more.

3. The image forming apparatus according to claim 1, wherein a set of the plurality of tone patches is prepared for each of a plurality of developer colors used by the image forming apparatus.

4. The image forming apparatus according to claim 1, wherein said image recording unit records a plurality of test patterns on the recording medium and records the background pattern for each of the test patterns.

5. The image forming apparatus according to claim 1, wherein said image recording unit records the background pattern around each of the plurality of tone patches.

6. The image forming apparatus according to claim 1, wherein said image recording unit records the background pattern only for one or more tone patches relatively higher in density than the rest of the plurality of tone patches.

7. The image forming apparatus according to claim 4, wherein said image processing unit performs image processing by applying a different image processing mode to each of the plurality of test patterns.

8. The image forming apparatus according to claim 7, wherein said image processing unit performs image processing by applying the same image processing mode to all the background patterns recorded around each of the plurality of test patterns.

9. The image forming apparatus according to claim 1, wherein said image processing unit applies an image processing mode corrected the previous time to the background pattern.

10. The image forming apparatus according to claim 1, wherein said image recording unit records the background pattern using a plurality of developer colors.

11. A tone characteristics correction method for an image forming apparatus, comprising the steps of:
generating a test pattern signal used to form a test pattern including a plurality of tone patches differing in tonality from each other;
applying image processing to the test pattern signal according to a predetermined image processing mode out of a plurality of image processing modes related to tone characteristics;
recording the test pattern on a recording medium according to the test pattern signal subjected to the image processing;
reading the test pattern recorded on the recording medium; and
correcting the image processing mode based on a result of reading the test pattern recorded on the recording medium,
wherein said step of recording the test pattern further comprises the step of recording a background pattern around a periphery of the test pattern on the recording medium to reduce influence from a ground of the recording medium.

12. The tone characteristics correction method according to claim 11, wherein said step of recording the test pattern comprising the step of reading the test pattern recorded on the recording medium, and
said step of reading the test pattern recorded on the recording medium comprising the step of recording a plurality of test patterns on the recording medium and recording the background pattern for each of the test patterns.

13. The tone characteristics correction method according to claim 11, wherein said step of reading the test pattern recorded on the recording medium comprising the step of recording the background pattern around each of the plurality of tone patches.

14. The tone characteristics correction method according to claim 11, wherein said step of reading the test pattern recorded on the recording medium comprising the step of recording the background pattern only for one or more tone patches relatively higher in density than the rest of the plurality of tone patches.

15. The tone characteristics correction method according to claim 12, wherein said step of applying image processing comprising the step of performing image processing by applying a different image processing mode to each of the plurality of test patterns.

16. The tone characteristics correction method according to claim 15, wherein said step of applying image processing comprising the step of performing image processing by applying the same image processing mode to all the background patterns recorded around each of the plurality of test patterns.

17. The tone characteristics correction method according to claim 11, wherein said step of applying image processing comprising the step of applying an image processing mode corrected the previous time to the background pattern.

18. The tone characteristics correction method according to claim 11, wherein said step of recording the test pattern comprising the step of recording the background pattern using a plurality of developer colors.

* * * * *